United States Patent [19]

Muszynski

[11] Patent Number: 6,009,328
[45] Date of Patent: Dec. 28, 1999

[54] INTER-EXCHANGE SOFT HANDOFF IN A CELLULAR TELECOMMUNICATIONS SYSTEM

[75] Inventor: Peter Muszynski, Espoo, Finland

[73] Assignee: Nokia Telecommunications Oy, Espoo, Finland

[21] Appl. No.: 08/619,461

[22] PCT Filed: Sep. 24, 1993

[86] PCT No.: PCT/FI93/00383

§ 371 Date: May 21, 1996

§ 102(e) Date: May 21, 1996

[87] PCT Pub. No.: WO95/08897

PCT Pub. Date: Mar. 30, 1995

[51] Int. Cl.⁶ .................................................. H04Q 7/20
[52] U.S. Cl. ................................. 455/442; 455/436
[58] Field of Search ............................ 455/436, 437, 455/438, 439, 442, 445, 455

[56] References Cited

U.S. PATENT DOCUMENTS

| | | | |
|---|---|---|---|
| 4,737,978 | 4/1988 | Burke et al. | 455/438 |
| 5,101,501 | 3/1992 | Gilhousen et al. | 455/442 |
| 5,267,261 | 11/1993 | Blakeney, II et al. | 455/437 |
| 5,278,892 | 1/1994 | Bolliger et al. | 455/442 |
| 5,305,308 | 4/1994 | English et al. | 455/445 |
| 5,640,414 | 6/1997 | Blakeney, II et al. | 375/200 |
| 5,722,074 | 2/1998 | Muszynski | 455/442 |
| 5,761,623 | 6/1998 | Lupien et al. | 455/439 |
| 5,850,607 | 12/1998 | Muszynski | 455/442 |

FOREIGN PATENT DOCUMENTS

| | | |
|---|---|---|
| 0 549 016 | 6/1993 | European Pat. Off. . |
| 0 566 551 | 10/1993 | European Pat. Off. . |
| 0 570 643 | 11/1993 | European Pat. Off. . |
| 0 577 322 | 1/1994 | European Pat. Off. . |

OTHER PUBLICATIONS

"An Overview of The Application of Code Division Multiple Access (CDMA) To Digital Cellular Systems and Personal Cellular Networks", *Introduction to CDMA and the CAI*, 1992, pp. 1–58.

*Primary Examiner*—William G. Trost
*Assistant Examiner*—Myron K. Wyche
*Attorney, Agent, or Firm*—Pillsbury Madison & Sutro, LLP

[57] ABSTRACT

In a cellular telecommunications system having mobile exchanges, base stations and mobile stations, the mobile exchanges are capable of both intra-exchange and inter-exchange soft handoffs. Thereby, a seamless soft handoff with signal diversity combining is obtained throughout the service area of the system, which preferably is a CDMA system.

10 Claims, 3 Drawing Sheets

INTER-EXCHANGE SOFT HANDOFF IN A CELLULAR TELECOMMUNICATIONS SYSTEM

FIELD OF THE INVENTION

The present invention relates to cellular telecommunications systems. More specifically, the present invention relates to a novel and improved system for soft handoff between a mobile station and base stations which are connected to different mobile switching centers within a cellular telecommunications system.

BACKGROUND OF THE INVENTION

The use of code division multiple access (CDMA) modulation is but one of several techniques enabling digital communications among a number of mobile users utilizing a common part of the radio spectrum, as is the case for cellular telecommunications systems. Other well-known radio access techniques are time division multiple access (TDMA) and frequency division access (FDMA). The concept of soft handoff to which the present invention is closely related, is indeed applicable to all three of the mentioned multiple access techniques and will result, if applied instead of the conventional hard handoff schemes, in increased system capacity and fewer dropped calls. However, soft handoff is mandatory for CDMA, as the use of conventional hard handoff would result in a very poor system performance. The background of the present invention will be presented for a CDMA cellular telecommunications system. However, it should be understood that the present invention is not limited to CDMA. An exemplary application of CDMA to cellular telecommunications systems has been substantially described in "On the System Design Aspects of Code Division Multiple Access (CDMA) Applied to Digital Cellular and Personal Communications Networks", Allen Salmasi and Klein S. Gilhousen, presented at the 41st *IEEE Vehicular Technology Conference* on May 19–22, 1991 in St. Louis, Mo.

In the above mentioned publication, a direct-sequence CDMA (DS-CDMA, or, for short, CDMA in the following) technique is described in which a number of user mobile stations (MSs) communicate via CDMA radio spread spectrum signals with base stations (BSs, also referred to as cell sites) in the uplink (mobile station to base station) and downlink (base station to mobile station) direction. The base stations convert these CDMA radio signals respectively originating from, and terminating at, the user's MS into a form appropriate for use in conjunction with terrestrial telecommunications transmission equipment such as the commonly deployed Pulse Code Modulation (PCM) circuit facilities. The base stations further relay these user signals in the uplink and downlink directions to a mobile switching center (MSC, also referred to as a mobile exchange or mobile telephone switching office (MTSO)) for further processing.

The above-mentioned user communication signals comprise digitized voice signals and control information (also referred to as signalling). The MSC performs multiplexing and conversion operations on the above-mentioned tributaries, and relays the voice signal to another user, e.g. within the Public Switched Telephone Network (PSTN). The MSC also interprets, reacts upon, and generates signalling information, thus controlling the overall communication links between the users. These communications link control functions comprise the management of general call related events such as call setup and tear down, as well as CDMA radio link-related events such as deterioration of CDMA radio link quality, and subsequent handoff initiation.

If CDMA is deployed within the typical medium, to large-sized cells of land mobile telecommunications systems, then the average time delay spread of the multipath radio propagation environment is usually longer than the duration of each chip of the DS-CDMA signal. This forces CDMA to operate in an asynchronous mode, with the consequence that the orthogonality of the spread spectrum multiple access user signals cannot be achieved by means of orthogonal spreading codes alone. Therefore, the communications suffer from system self-induced interference, not only among signals originating from different cells, but in addition to that, also, considerably, within a single cell (referred to as CDMA intra-cell interference). For such CDMA cellular systems, it is therefore an important overall system design objective to minimize any excessive CDMA interference among the communicating users and it is a complementary design objective, to capture and utilize as much energy from a desired CDMA user signal as possible. This system design requirement, although a generic requirement applicable to any multiple access method within cellular telecommunications systems, is less stringent for FDMA and TDMA based systems in which intra-cell interference is avoided by the intrinsic properties of the respective multiple access method and inter-cell interference is limited by means of pre-planned cellular frequency re-use schemes. Thus, CDMA unlike FDMA or TDMA operates in a strictly interference-limited manner.

Nevertheless, soft handoff will also improve the TDMA system capacity. However, the gain will be less than for a CDMA system. In the following, the invention is for the case of a CDMA cellular telecommunications system.

Several methods for implementing the above-mentioned CDMA system design objective can be readily identified for the above-referenced exemplary embodiment of a CDMA cellular telecommunications system. For example, the described closed loop MS transmit power control method has the objective to continuously equalize the received qualities of all uplink CDMA signals within a single BS against the background of rapidly changing radio propagation channels undergoing fast and slow fading processes. For this purpose, the BS measures periodically the received $E_b/N_o$ value, indicative of the signal quality, from each MS CDMA uplink communication and subsequently transmits an appropriate power control command on the downlink communication channel to the MS which, in turn sets the CDMA transmitter power accordingly- Ideally, all MS CDMA uplink signals are received at the BS with the same quality, and, in addition to that, minimum strength necessary in order to maintain the communication link subject to a predetermined quality threshold.

Another embodiment of the previously mentioned system design objective is the method of mobile assisted soft handoff in conjunction with signal diversity combining during an active CDMA communication which will be summarized in the following and to which the present invention is closely related.

Mobile assisted soft handoff in conjunction with signal diversity combining comprises the method of relaying user communication signals on the transmission segment between MS and MSC concurrently via a first and a second BS in the uplink and downlink direction and performing signal diversity reception at the MS and MSC in order to enhance the user signal quality. This method is invoked by the MSC when an MS communicating initially with a BS has moved into the overlapping coverage areas of this first BS and a second BS and has reported the availability of a sufficiently strong signal from this second BS to the MSC. At no time instant during soft handoff in conjunction with signal diversity combining does the MS interrupt its communications with the MSC. The MSC typically deploys postdetection/decoding, selective combining of the digitally encoded speech frames.

In order to enable the reporting assistance of the MS during soft handoff initiation, all BSs may transmit a CDMA downlink reference signal, referred to a pilot signal. MSs when roaming throughout the service area of the CDMA cellular telecommunications system periodically demodulate the pilot signals of the various neighboring BSs during an ongoing communication with a first BS and derive a corresponding pilot signal quality indication. Again, the measured pilot $E_b/N_o$ may come as a signal strength/quality indication. This indication determines a ranked list of candidate BSs for handoff and is transmitted in the form of signalling information to the MSC. It should be understood that, also the first BS may perform continuously CDMA uplink signal quality measurements, and, based upon these observations, may give a soft handoff request indication to the MSC.

Usually, soft handoff in conjunction with signal diversity combining is initiated by the MSC if the MS reports that the pilot signal quality of a second BS in addition to that of the first BS is sufficiently good according to the predetermined thresholds made available to the MS . The MSC, as well as the second BS, can obtain the required resources for the soft handoff transition. Subsequently, the MS will be instructed by the MSC via the first BS by means of signalling to initiate a soft handoff and to commence signal diversity combining on the downlink.

Moreover the MSC initiates the additional relay of user signals via the second BS and commences diversity combining of the user signal in the uplink direction. Both participating BSs invoke autonomously the previously mentioned closed loop power control method. The MS sets its CDMA transmit power to the minimum of the two commanded power levels in order to reduce excessive CDMA interference with the other communication links.

Finally, when the MS is firmly established within the area of the second BS and the pilot signal received from the first BS has weakened sufficiently according to the predetermined thresholds made available to the MS it the MS will report this condition to the MSC which in turn decides to terminate the soft handoff with signal diversity combining and will use subsequently only the second BS for maintaining the CDMA communications.

This process of soft handoff with signal diversity combining may be repeated as the MS moves within the service area of the CDMA cellular telecommunications system and as the measured CDMA signal quality indications suggest.

Some of the contemporary TDMA based cellular telecommunications systems also utilize the assistance of the MS in form of corresponding MS downlink signal quality measurements as a trigger for requesting a handoff from a first BS to a second BS, much in the same way as summarized above. However, these systems usually use a scheme referred to as hard handoff, in which the MS, in response to instructions from the MSC disrupts the communication with the first BS, tunes into the indicated TDMA radio channel of the second BS, and then resumes the uplink and downlink communications. At no time instant does the MS communicate with more than one BS simultaneously and hence, no corresponding signal diversity combining takes place in the MS nor in the MSC as is the case for the soft handoff method described above. This hard handoff scheme is applicable to CDMA in a similar manner as well, but should be avoided whenever possible, for reasons of CDMA system capacity as explained in the following. As mentioned above, though less useful, the inter-exchange soft handoff is applicable to TDMA and FDMA as well.

Within the context of soft and hard handoff the previously mentioned predetermined thresholds used in conjunction with the MS downlink signal quality measurements for the determination of handoff candidate BSs are also referred to as handoff margins. The use of these handoff margins in conjunction with time a hyphen averaging processes is necessary in order to avoid frequent handoffs (also referred to as handoff Ping-Pong effect) when the MS moves within the usually fuzzy border between the radio signal coverage areas of two neighboring BSs. Such frequent handdoffs would overload the processing capacity of the MSCs. For the purpose of controlling the CDMA soft handoff with signal diversity combining, the handoff margin can be chosen, as small as 1–3 dB, in contrast to the hard handoff case where usually 6–10 dB are required in order to avoid the deleterious handoff Ping-Pong effect.

Referring to the previously mentioned interference limited operation of CDMA, small handoff margins are indeed an essential requirement for an efficient operation of CDMA. The use of CDMA hard handoff in conjunction with the necessary large hard handoff margins would substantially decrease the CDMA system capacity. In a CDMA cellular telecommunications system, hard handoff can be tolerated only in exceptional situations but not as a normal mode of system operation. Soft handoff with signal diversity combining therefore is to be provided on a seamless basis throughout the CDMA system service area.

Prior art CDMA cellular telecommunications systems provide soft handoff with signal diversity combining only between BSs which are connected to one and the same MSC (referred to as intra-MSC soft handoff with signal diversity combining). If the MS is to be handed off between BSs connected to different MSCs, prior art CDMA cellular telecommunications systems use CDMA hard handoff instead with the above, mentioned disadvantages from the capacity point of view.

SUMMARY OF THE PRESENT INVENTION

It is an object of the present invention to provide a system and a method for accomplishing soft handoff with signal diversity combining among base stations connected to different mobile exchanges of a cellular telecommunications system, in the following referred to as inter-exchange soft handoff with signal diversity combining. The present invention thus relates to a system and a method to provide seamless soft handoff throughout the service area of a whole cellular telecommunication system.

One aspect of the invention is, in a cellular telecommunications system in which a user mobile station relays user information radio signals via at least one of a plurality of base stations and in which the base stations further relay the user information signals via at least one of a plurality of mobile exchanges to and from another system user, a method for inter-exchange soft handoff with diversity combining, comprising the steps of:

maintaining the relay of user information signals between a mobile station and a first mobile exchange via a first base station connected to the first mobile exchange, the first mobile exchange further relaying the user information signals to and from another system user, the first mobile exchange controlling the user communications, establishing a further second connection for further second relay of the user information signals between the mobile station and the first mobile exchange via a further second base station connected to a further second mobile exchange, the second mobile exchange further relaying said the communications signals to the first mobile exchange, performing diversity combining at the first mobile exchange of said user information signals as relayed from the mobile station to the first mobile exchange via the first connection and the further second connection, the first mobile exchange offering the combined user information signal to the other system user, performing further diversity combining at the mobile station of said the information signals as relayed from the other system user to the first mobile exchange and relayed further via the first connection and said further second connection to the mobile station.

The invention enables accomplishment an inter-exchange soft handoff, and thereby allows accomplishment a seamless soft handoff with signal diversity combining throughout the service area of the system.

Other well-known radio access techniques are time division multiple access (TDMA) and frequency division access (FDMA). The concept of soft handoff to which the present invention is closely related, is indeed applicable to all three of the above mentioned multiple access techniques and will result, if applied instead of the conventional hard handoff schemes, in increased system capacity and fewer dropped calls. However, soft handoff is mandatory for CDMA, as the use of conventional hard handoff would result in a very poor system performance. For these reasons, the preferred embodiment of the present invention is in a CDMA cellular telecommunications system. However, it should be understood that the present invention is not limited to CDMA.

One aspect of the invention is a cellular telecommunications system comprising a plurality of mobile exchanges, a plurality of base stations and a plurality of mobile stations roaming throughout the system area, in which a user mobile station relays user information radio signals via at least one of a plurality of base stations and in which the base stations further relay the user information signals via at least one of a plurality of mobile exchanges to and from another system user, the system of inter-exchange soft handoff with diversity combining, the system comprising:

means at each mobile station of the plurality of mobile stations and at each base station of the plurality of base stations and at each mobile exchange of the plurality of mobile exchanges, to maintain the relay of user information signals between a mobile station and a first mobile exchange via a first base station connected to the first mobile exchange, further means at the first mobile exchange for further relaying the user information signals to and from another system user, further means at the first mobile exchange for controlling the user communications, means at each mobile station of the plurality of mobile stations and at each base station of the plurality of base stations and at each mobile exchange of the plurality of mobile exchanges for establishing a further second connection for further second relay of the user information signals between the mobile station and the first mobile exchange via a further second base station connected to a further second mobile exchange, the second mobile exchange comprising further means for further relaying the user communications signals to said first mobile exchange, means at the first mobile exchange for performing combining of the user information signals as relayed from the mobile station to the first mobile exchange via the first connection and the further second connection, the first mobile exchange comprising further means for offering the combined user information signal to the other system user, means at the mobile station for performing further diversity combining of the user information signals as relayed from the other system user to the first mobile exchange and relayed further via said first connection and the further second connection to the mobile station.

BRIEF DESCRIPTION OF THE DRAWINGS

The features and advantages of the present invention will become more apparent from the detailed description set forth below, when taken in conjunction with the attached drawings in which.

DETAILED DESCRIPTION OF THE PREFERRED EMBODIMENTS

Figure 1:
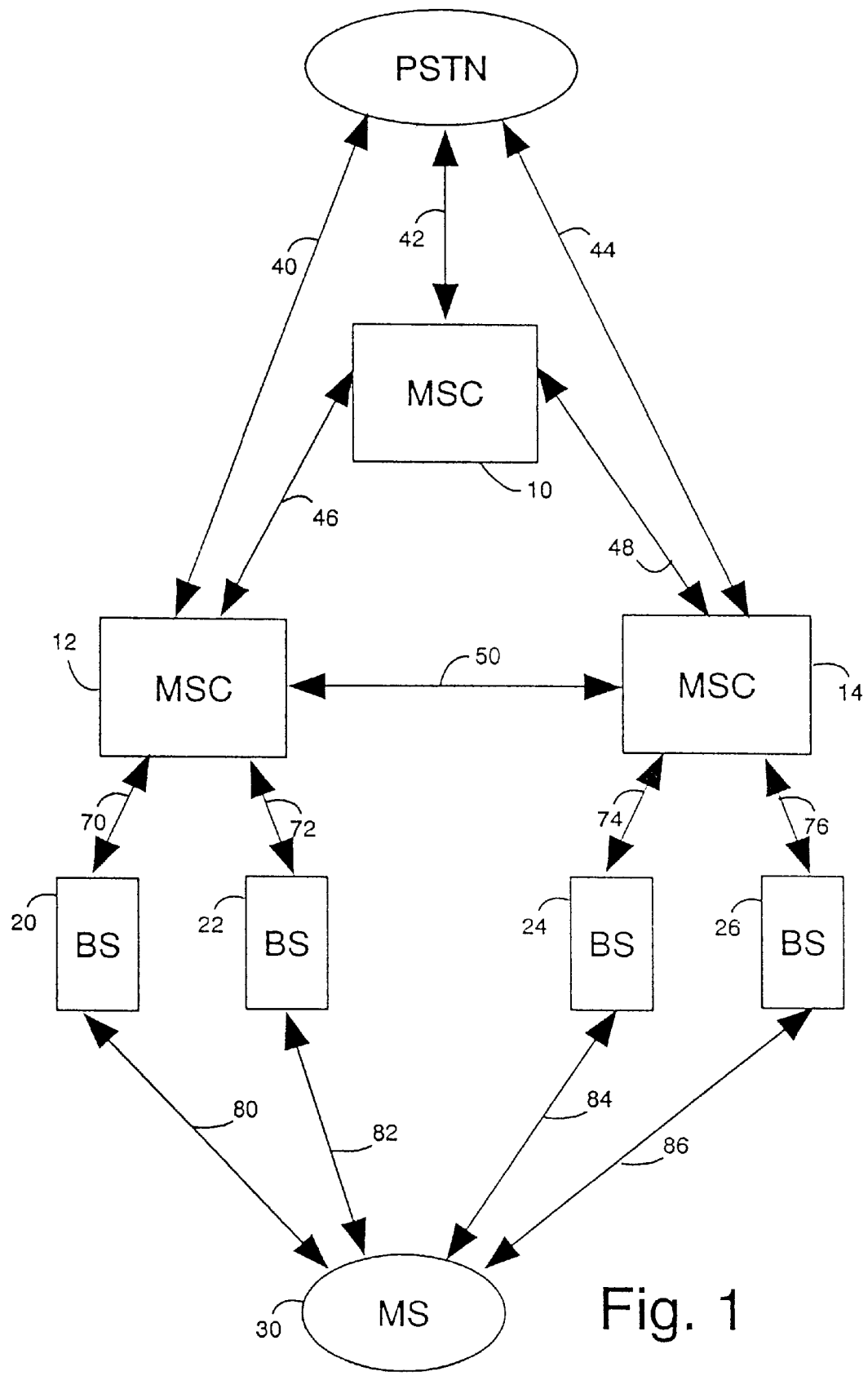
FIG. 1 is a schematic overview of an exemplary CDMA cellular telecommunications system in accordance with the present invention.

FIG. 1 shows an exemplary embodiment of a CDMA cellular telecommunications system to which the present invention relates. The system illustrated in FIG. 1 improves upon the prior art CDMA soft handoff and macrodiversity signal combining techniques, as those are substantially described in "On the System Design Aspects of Code Division Multiple Access (CDMA.) Applied to Digital Cellular and Personal Communications Networks", Allen Salmasi and Klein S. Gilhousen, presented at the 41st *IEEE Vehicular Technology Conference* on May 19–22, 1991 in St. Louis, Mo.

Figure 2:
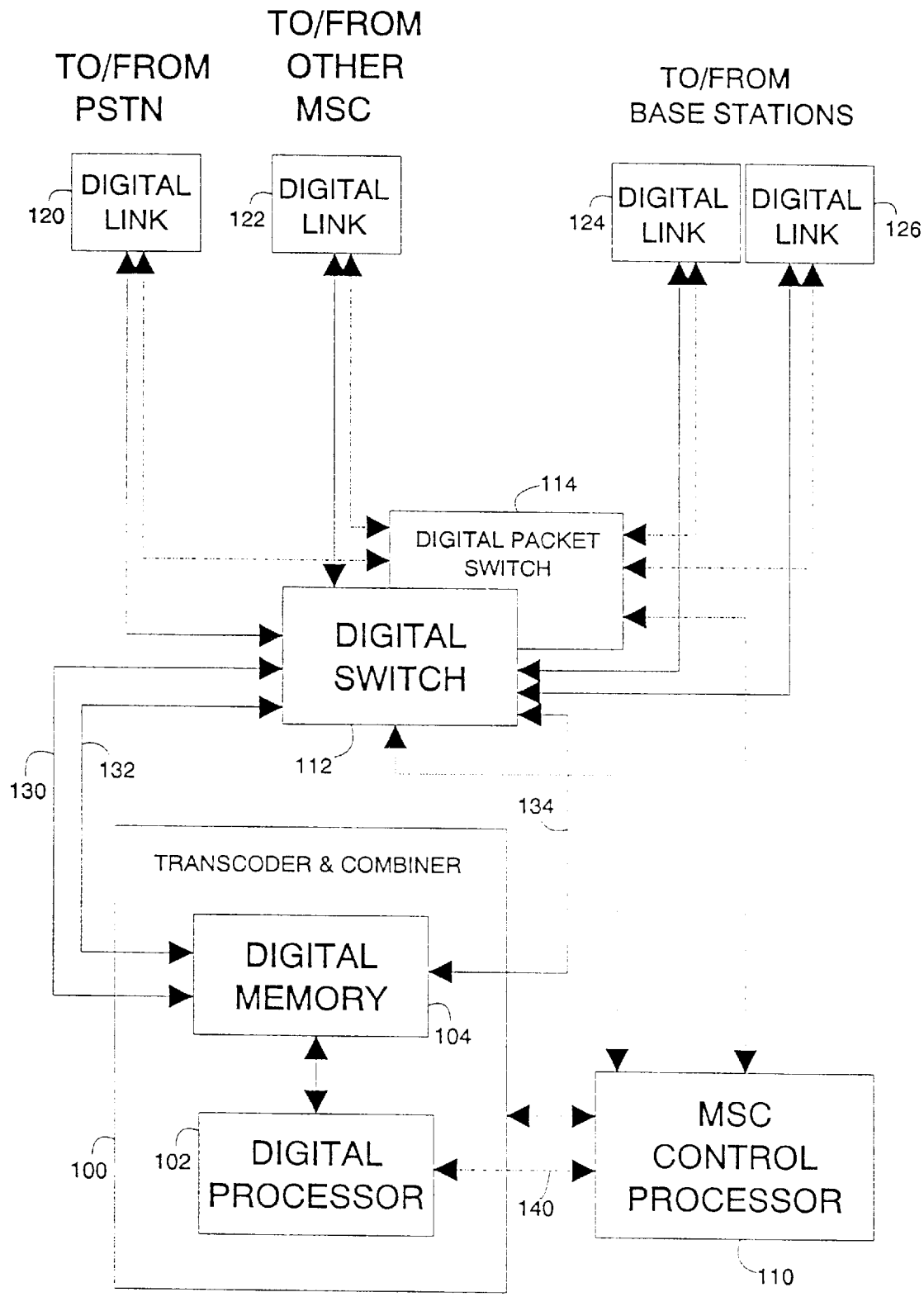
FIG. 2 is a block diagram showing a preferred embodiment of a mobile switching center for use within a CDMA cellular telecommunications system.

FIG. 2 shows an exemplary embodiment of an MSC used in a CDMA cellular telecommunications system to which the present invention relates.

Digital links (120,122,124,126) connect the mobile exchange MSC with the Public Switched Telephone Network PSTN, other mobile exchanges MSC, and base stations BS, respectively. These digital links carry the user information, such as voice and, additionally, signalling information. The preferred embodiment of the present invention assumes that tine signalling information on is multiplexed together with the user information onto one and the same physical transmission facility. T1 transmission facilities together with Signalling System No. 7 may serve as an exemplary embodiment of such a digital link arrangement.

The user information stream is switched among the herein mentioned entities by means of a digital switch 112. The corresponding signalling information is transmitted, received and relayed by a packet switch 114. Packet switch 114 is also connected to an MSC control processor 110 which acts as a signalling information source and sink, respectively. The MSC control processor 110 interprets and reacts upon signalling messages addressed to it and may also solicit signalling messages to other entities, whenever appropriate the MSC control processor 110 also controls the connection arrangements within the digital switch 112 in accordance with the call status. Moreover, the MSC control processor 110 allocates and releases transcoder and combiner equipment 100 during call setup and tear down from a corresponding resource pool (only one piece of this transcoder and combiner equipment 100 is shown in the figure)

Transcoder and combiner equipment 100 is needed in order to convert between the typically μ-law encoded voice as used in the PSTN and the low rate digital voice coding such as CELP used on the radio links. In addition to the transcoding function, transcoder and combiner equipment 100 also implements the signal diversity combing in the uplink direction and signal duplication in the downlink direction. Moreover, transcoder and combiner equipment 100 synchronizes during soft handoff with signal diversity combining the information flows to and from the participating BSs, transmitted on the digital links 124,126 and switched through digital switch 112 via circuits 130,132 with the information flow to and from the PSTN, switched through the digital link 120, digital switch 112 and circuit 134 (only 2-branch BS diversity is depicted in FIG. 2).

In the preferred embodiment of the present invention, the user communication signals, comprising digitized voice or data, multiplexed together with the signalling information related to this connection, are carried in a digital, framed format suitable for the terrestrial transmission links 124,126 between the BSs and the MSC. These frames are subsequently referred to as transcoder and combiner frames. In addition to this user information, transcoder and combiner frames may also contain information supplied by the BSs which is relevant to the signal quality as used for the signal diversity combining within the MSC in the unlink direction. Moreover, the transcoder and combiner frames may contain digital signals supplied by the BSs and the MSC which are relevant for synchronizing the simultaneous links 124,126 between the BSs and the MSC during a soft handoff with signal diversity combining.

These transcoder and combiner frames arriving and leaving on the circuits 130,132,134 are buffered in the digital memory 104 for the unlink and downlink direction, respectively. Digital processor 102 reads and writes cyclically the transcoder and combiner frames from and to the digital memory 104. In the unlink direction, a signal quality indication attached to the transcoder & combiner frames arriving from the circuits 130,132 into the memory 104 is inspected and processor, 102 performs the diversity selection based on these indications. In the downlink direction, voice samples arriving from circuit 134 into the memory 104 are transcoded and packed into transcoder & combiner frames by processor 102.

Transcoder and combiner equipment 100 by means of the digital processor 102 also respectively extracts, inserts, the user signalling information, from, into, the transcoder and combiner frames, and offers, receives, this signaling information to the MSC control processor 110 via a circuit 140. By these means, the MSC control processor 110 receives the MS signalling information such as pilot signal quality measurement reports. Thus, the MSC control processor 110 possesses the necessary information to initiate and terminate inter-MSC and intra-MSC soft handoffs. Furthermore, by these means MSC control processor 110 can issue the appropriate handoff commands to the MS via circuits 140, 130,132 and links 124,126, as well as via the digital packet switch 114 and link 122 to other MSCs, should this be required.

Figure 3:
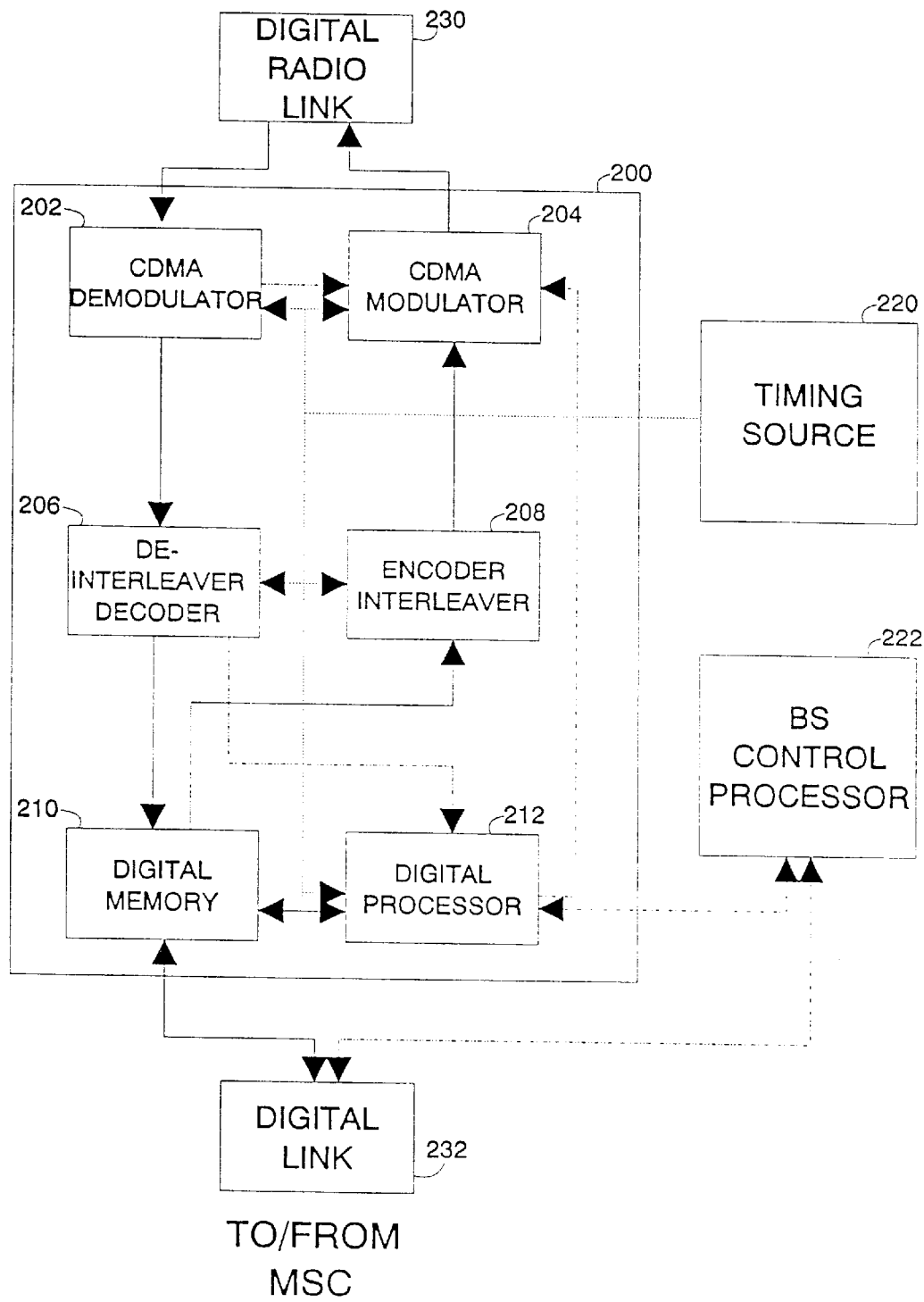
FIG. 3 is a block diagram showing a preferred embodiment of a base station for use within a CDMA cellular telecommunications system.

FIG. 3 shows an exemplary embodiment of a BS used in a CDMA cellular telecommunications system to which the present invention relates.

Block 200 shows the apparatus required to support a single CDMA communication within a BS, referred to as CDMA channel equipment (only one is being shown).

In the uplink direction, the CDMA user communication signals are received from the digital CDMA radio link 230, demodulated by the CDMA demodulator 202, de-interleaved and channel decoded by the de-interleaver and decoder 206, converted into transcoder and combiner frames and buffered for the terrestrial transmission within digital memory 210 and finally transmitted on the digital link 232 towards the MSC.

In the downlink direction, the transcoder and combiner frames are received from the MSC via digital link 232, buffered and converted into a presentation appropriate for the BS within the digital memory 210, channel encoded and interleaved by the encoder & interleaver 208, CDMA modulated by the CDMA modulator 204 and finally transmitted on the digital radio link 230.

In the preferred embodiment of the present invention, the BS possesses a network hyphen independent timing source 220 which provides a reference signal of high accuracy as required for efficient CDMA operation and utilized by the CDMA channel equipment 200. Such a timing source may be derived, e.g. from the GPS satellite signal a and can be provided globally to each BS, thus enabling provision of a network of mutually synchronized BSs.

The BS further comprises a BS control processor 222. The BS control processor 222 receives and transmits signalling information from and to the digital link 232 connected to the MSC. The BS control processor 222 performs the resource management of the BS, such as the allocation and releasing CDMA channel equipment for user connections (calls). The BS control processor 222 thus responds to CDMA channel assignment requests related to call setup as well as to CDMA channel assignment requests related to soft handoff requests from the MSC.

The digital processor 212, in conjunction with the buffer memory 210, performs the packing and unpacking of the BS internal representation of the CDMA user communications signal and from transcoder & combiner frames respectively in the uplink, downlink directions. In the preferred embodiment of the present invention, the previously mentioned transcoder and combiner frames also contain information supplied by the de-interleaver and channel decoder 206 and provided to the digital processor 212 which is indicative of the signal quality of the CDMA radio frames as received from the uplink CDMA radio link 230 and which is used for the signal diversity combining within the MSC in the uplink direction.

As noted above, the present invention relates to soft handoff and macrodiversity signal combining techniques. Within a cellular telecommunications system of the present invention, soft handoff with signal diversity combining can be performed even in the case that the involved BSs are connected to two different MSCs, in the following referred to as inter-MSC soft handoff with signal diversity combining. These MSCs are assumed to be connected either permanently or temporarily via digital links for the transmission of user communication signals and inter-MSC handoff a hyphen signalling information.

The cellular telecommunications system of the present invention further assumes the use of the mobile assisted soft handoff method as previously described for prior art systems, including the transmission of pilot signals by all BSs as a downlink signal quality reference, appropriate pilot signal quality measurement and processing equipment within the MS and signalling means between the MS and the controlling MSC in order to communicate handoff trigger conditions, and handoff initiation, termination, commands based upon the pilot signal strength measurements performed by the MS. In the following the operation of the invention will be illustrated in the context of a CDMA system. However, the invention is not intended to be restricted to CDMA systems and may be applied in any multiple access system.

Initiation of inter-MSC soft handoff with signal diversity combining (FIG. 1)

In the following, it is assumed that an MS 30 communicates via a first BS 24 connected to a first MSC 14, which provides access to the PSTN and other MSCs 10,12.

The inter-MSC soft handoff with signal diversity combining is initiated when the MS 30 moves from the coverage area of the serving BS 24 connected to the first MSC 14 to the coverage area of a second BS 22 connected to a second MSC 12 and the MS pilot signal quality measurements indicate that a soft handoff to the second BS 22 is appropriate. The MS signals this measurement indication via the first BS 24 to the first MSC 14, including identification information of the second BS 22.

The first MSC 14 in turn detects from cellular configuration data that BS 22 s connected to another MSC 12 and passes subsequently an inter-MSC soft handoff request to this second MSC 12. This handoff request identifies the CDMA code channel and the frequency which the MS 30 currently uses and additionally, the identity of the inter-MSC circuit 50 reserved by MSC 14 for the this transaction.

MSC the 12 passes this handoff request further on to the BS 22 a after reserving and switching through an appropriate circuit 72. BS 22 analyzes the handoff request and if the requested resources are available allocates a further CDMA code channel to be used by MS 30 for the downlink connection 82 which is signaled back to MSC 12 and MSC 14. BS 22 will also activate the downlink direction of connection 82 using the newly assigned CDMA code channel. BS 22 will further start demodulating the CDMA uplink connection 82 using the CDMA context information related to MS 30 and subsequently relaying the user communication signals via MSC 12 back to MSC 14 or diversity combining. BS 22 may signal the successful acquisition and reception of to CDMA unlink connection 82 to MSC 14 via MSC 12.

MSC 14 will send a handoff request via BS 24 to MS 30 including the identity of the newly allocated CDMA code channel. MSC 14 will also commence diversity signal combining of the user communication signals on the uplink once the user communications signals following the legs 84—74, respectively 82—72—50, have been received in synchronism.

MS 30, after having received the handoff request a commences signal diversity combining of the first CDMA downlink connection 84 and the second, newly allocated downlink connection 82. The successful initiation of the inter-MSC soft handoff with signal diversity combining is then signaled from MS 30 to MSC 14.

Termination of inter-MSC soft handoff with signal diversity combining (FIG. 1)

The inter-MSC soft handoff with signal diversity combining is terminated if the MS leaves completely the coverage area of one of the participating BSs and penetrates deeply into the coverage area of the other BS.

In the following, it is assumed that MS 30 has penetrated deeply into the cell covered by BS 22 and therefore the pilot signal coming from BS 24 has weakened below a predetermined threshold in the previously described inter-MSC sofhand off configuration. Thus, the leg 84—74 shall be removed from the inter-MSC soft handoff with signal diversity combining.

MS 30 will inform MSC 14 via a pilot signal quality measurement report that the signal coming from BS 24 has weakened below a predetermined threshold. MSC 14 decides to drop the leg 84—74, and thus to terminate the inter-MSC soft handoff with signal diversity combining. To this end, MSC 14 sends a handoff termination signal via BS 24 and MSC 12—BS 22 to MS 30. MS 30 will stop the downlink demodulation diversity combining of the signal coming from BS 24 and will communicate from now on with BS 22 only. MS 30 signals via BS 22 and MSC 12 the successful termination of the inter-MSC soft handoff with signal diversity combining back to MSC 14 which in turn will request BS 24 to terminate the CDMA radio link 84 and to release the corresponding resources. MSC 14 will also free the terrestrial link 74 and terminate the uplink diversity combining. This completes the termination of the inter-MSC soft handoff with signal diversity combining. It should be understood that MSC 14 is still in charge of all control and signalling functions related to the communications with MS 30. Functionally, the leg 50—72—82 is treated similarly to a direct MSC—BS interconnection (such as via BS 24); the only difference is the additional relay functions performed by MSC 12. MSC 12 will therefore be completely transparent to all control and signalling functions invoked by MSC 14, BS 22 and MS 30.

As a further example of the above a hyphen described inter-MSC handoff with signal diversity combining, assume that the MS 30 has been moving back into the coverage area of the cell covered by BS 24 and therefore the pilot signal quality coming from BS 22 has weakened below a predetermined threshold. Thus, the leg 82—72—50 shall be removed (note that in this case the previously reserved circuit 50 is also removed) and leg 74-84 established using the above described soft handoff method as follows:

MS 30 will inform MSC 14 via a pilot signal quality measurement report that the signal coming from BS 22 has weakened below a predetermined threshold. Subsequently, MSC 14 decides to drop the leg 82—72—50. To this end, MSC 14 sends a handoff signal via BS 24 and MSC 12—BS 22 to MS 30. MS 30 will stop the downlink demodulation diversity combining of the signal coming from BS 22 and will communicate from now on with BS 24 only. MS 30 signals the successful inter-MSC soft handoff with signal diversity combining back to MSC 14 which in turn will signal to MSC 12 about the inter-MSC soft handoff. MSC 12, in turn, will request BS 22 to terminate the CDMA radio link 82 and to release the corresponding resources. MSC 14 will also free the terrestrial link 50 and terminate the uplink diversity combining.

It should be understood that the above, described inter-MSC soft handoff with signal diversity combining may be applied several times during an ongoing communication. It should also be understood that more than two BSs can participate during an inter-MSC soft handoff with signal diversity combining. E.g., it may have been the case that in addition to BS 24 and BS 22 also BS 20 would have participated via link 70 and an additional circuit on the link 50 in the inter-MSC soft handoff with signal diversity combining. Also, more than two MSCs may participate in an inter-MSc soft handoff with signal diversity combining. E.g., it may have been the case that in addition to BS 24 and BS 22 another BS (not shown) connected to MSC 10 would have participated via link 48 in the inter-MSC soft handoff with signal diversity combining. Common to these scenarios, is that MSC 14 is always in charge of all control and signaling functions related to the communications with MS 30 and thus serves an anchor regarding all CDMA radio resource related functions.

It should also be understood that the method of the present invention can be readily applied to a TDMA cellular telecommunications system. In a TDMA cellular telecommunications system, radio links 80, 82, 84, 86 of 1, would be embodied as TDMA radio links in which several timeslots are used to provide communication channels to the system users. During soft handoff, in particular, during inter-exchange soft handoff with diversity combining, two (or more) timeslots can be used to provide the concurrent radio channels used by the MS and BSs involved in the handoff. All the other mentioned characteristics o: the present invention remain the same for use of the invention a TDMA cellular telecommunications system.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

What is claimed is:

1. In a cellular telecommunications system in which a user mobile station relays user information radio signals via at least one of a plurality of base stations and in which said base stations further relay said user information signals via at least one of a plurality of mobile exchanges to and from another system user, the a method for inter-exchange soft handoff with diversity combining, comprising the steps of:

maintaining the relay of user information signals between a mobile station and a first mobile exchange via a first base station connected by a first connection to said first mobile exchange, said first mobile exchange further relaying the user information signals to and from another system user, said first mobile exchange controlling the user communications, establishing a further second connection for further second relay of said user information signals between said mobile station and said first mobile exchange via a further second base station connected to a further second mobile exchange, said second mobile exchange further relaying said user communications signals to said first mobile exchange, performing diversity combining at said first mobile exchange of said user information signals as relayed from said mobile station to said first mobile exchange via said first connection and said further second connection, said first mobile exchange offering the combined user information signal to said other system user, performing further diversity combining at said mobile station of said user information signals as relayed from said other system user to said first mobile exchange and relayed further via said first connection and said further second connection to said mobile station.

2. The method according to claim 1, in which the step of establishing said further second connection comprises the steps of:

measuring the signal quality of surrounding base stations at said mobile station located in the coverage area of said first base station and of said further second base station, signalling the measurement results of said measurements from said mobile station to said first mobile exchange via said first base station using a first radio connection, initiating, on the basis of said measurement results an inter-exchange soft handoff with diversity combining towards said further second base station, said handoff initiation comprising the further steps of:

determining that said second base station is connected to said further second mobile exchange, transmitting an inter-exchange soft handoff request signal from said first mobile exchange to said second mobile exchange, said inter-exchange soft handoff request signal identifying said radio connection used to relay said user information radio signals between said mobile station and said first base station, allocating a connection between said first mobile exchange and said second mobile exchange for the inter-exchange soft handoff with diversity combining, allocating a connection between said second mobile exchange and said second base station for the inter-exchange soft handoff with diversity combining, allocating a further radio connection between said mobile station and said second base station for the inter-exchange soft handoff with diversity combining, coupling the said connection between said first mobile exchange and said second mobile exchange with said connection between said second mobile exchange and said second base station and further coupling with said second radio connection between said mobile station and said second base station, in order to form a further second connection for further second relay of said user information signals between said mobile station and said first mobile exchange, transmitting an inter-exchange soft handoff response signal to said first mobile exchange, said inter-exchange soft handoff response signal, being responsive to said inter-exchange soft handoff request signal and said inter-exchange soft handoff response signal identifying the said further second radio connection to be used to relay said user information radio signals between said mobile station and said second base station, transmitting a soft handoff request signal between said first mobile exchange to said mobile station via at least said first base station, said soft handoff request signal identifying said further second radio connection used to relay said user information radio signals between said mobile station and said second base station, relaying said user information signals between said mobile station and said first mobile exchange concurrently via said first connection including said first base station and via said second connection including said second base station and said second mobile exchange.

3. The method according to claim 1, further comprising the step of inter-exchange soft handoff termination, including the steps of:

measuring the signal quality of surrounding base stations at said mobile station located in the coverage area of said first base station and of said further second base station, signalling the measurement results of said measurements from said mobile station to said first mobile exchange via at least one of said first connection or said further second connection, terminating, on the basis of said measurement results said inter-exchange soft handoff condition, said handoff termination comprising the further steps of:

transmitting a soft handoff termination signal from said first mobile exchange to said mobile station via at least one of said first base station or said second base station, transmitting a soft handoff termination request signal from said first mobile exchange to said second mobile exchange, terminating the said diversity combining at said first mobile exchange, terminating the said diversity combining at said mobile station, terminating the radio connection between mobile station and said first base station, terminating the connection between said first base station and said first mobile exchange, maintaining the connection between said mobile station and said first mobile exchange via said second base station and said second mobile exchange, said first mobile exchange still controlling the user communication.

4. The method according to claim 1 or 2 wherein said user information radio signals relayed between said mobile station and said first and said second base station are CDMA spread spectrum modulated.

5. The method according to claim 1 or 3 wherein the user information radio signals relayed between said mobile station and said first and said second base station are CDMA spread spectrum modulated.

6. The method according to claim 1 or 2 wherein said user information radio signals relayed between said mobile station and said first and second base station are TDMA modulated.

7. The method according to claim 1 or 3 wherein the user information radio signals relayed between said mobile station and said first and second base station are TDMA modulated.

8. In a cellular telecommunications system comprising a plurality of mobile exchanges, a plurality of base stations and a plurality of mobile stations roaming throughout the system area, in which a user mobile station relays user information radio signals via at least one of a plurality of base stations and in which said base stations further relay said user information signals via at least one of a plurality of mobile exchanges to and from another system user, a system of inter-exchange soft handoff with diversity combining, said system comprising:

means at each mobile station of said plurality of mobile stations and at each base station of said plurality of base stations and at each mobile exchange of said plurality of mobile exchanges, to maintain the relay of user information signals between a mobile station and a first mobile exchange via a first base station connected by a first connection to said first mobile exchange, further means at said first mobile exchange for further relaying the user information signals to and from another system user, further means at said first mobile exchange for controlling the user communications, means at each mobile station of said plurality of mobile stations and at each base station of said plurality of base stations and at each mobile exchange of said plurality of mobile exchanges for establishing a further second connection for further second relay of said user information signals between said mobile station and said first mobile exchange via a further second base station connected to a further second mobile exchange, said second mobile exchange comprising further means for further relaying said user communications signals to said first mobile exchange, means at said first mobile exchange for performing combining of said user information signals as relayed from said mobile station to said first mobile exchange via said first connection and said further second connection, said first mobile exchange comprising further means for offering the combined user information signal to said other system user, means at said mobile station for Performing further diversity combining of said user information signals as relayed from said other system user to said first mobile exchange and relayed further via said first connection and said further second connection to said mobile station.

9. The system according to claim 8, further comprising means at each base station of said plurality of base stations for transmitting a pilot signal indicative of each base station of origin, means at said mobile station for measuring the signal quality of said pilot signals of surrounding base stations, said mobile stations located in the coverage area of said first base station and of said further second base station, means at said mobile station and at said first base station and at said first mobile exchange for signalling the measurement results of said pilot signal measurements from said mobile station to said first mobile exchange via said first base station using a first radio connection, means at said mobile station and at said first and said second base station and at said first and said second mobile exchange for initiating, on the basis of said measurement results an inter-exchange soft handoff with diversity combining towards said further second base station, said handoff initiation necessitating the further means of:

means at said first mobile exchange for determining that said second base station is connected to said further second mobile exchange means at said first, respective second mobile exchange for transmitting respective receiving an inter-exchange soft handoff request signal from said first mobile exchange to said second mobile-exchange, said inter-exchange soft handoff request signal identifying said radio connection to be used to relay said user information radio signals between said mobile station and said first base station, means at said first and said second mobile exchange for allocating a connection between said fist mobile exchange and said second mobile exchange for the inter-exchange soft handoff with diversity combining, means at said second base station and at said second mobile exchange for allocating a connection between said second mobile exchange and said second base station for the inter-exchange soft handoff with diversity combining, means at said mobile station and at said second base station for allocating a further radio connection between said mobile station and said second base station for the inter-exchange soft handoff with diversity combining, means at said second base station and at said second mobile exchange for coupling the said connection between said first mobile exchange and said second mobile exchange with said connection between said second mobile exchange and said second base station and further coupling with said second radio connection between said mobile station and said second base station, in order to form a further second connection for further second relay of said user information signals between said mobile station and said first mobile exchange, means at said second mobile exchange for transmitting and means at said first mobile exchange for receiving an inter-exchange soft handoff response signal, said inter-exchange soft handoff response signal, being responsive to said inter-exchange soft handoff request signal and said inter-exchange soft handoff response signal identifying the said further second radio connection used to relay said user information radio signals between said mobile station and said second base station, means at said first mobile exchange for transmitting a soft handoff request signal between said first mobile exchange to said mobile station via at least said first base station, said soft handoff request signal identifying said further second radio connection to be used to relay said user information radio signals between said mobile station and said second base station, further means at said mobile station and said at least first base station to receive said handoff request signal and to establish said second radio connection, means at said mobile station and at said first and said second base station and at said first and said second mobile exchange for relaying said user information signals between said mobile station and said first mobile exchange concurrently via said first connection including said first base station and via said second connection including said second base station and said second mobile exchange.

10. The system according to claim 8 or 9, wherein the cellular system a CDMA system or a TDMA system.

* * * * *